United States Patent
Kobayashi

(10) Patent No.: US 10,027,851 B2
(45) Date of Patent: Jul. 17, 2018

(54) COLOR PATCH GENERATION FOR VISUAL SELECTION IN THE COLOR ADJUSTMENT OF A COLOR PRINT APPARATUS

(71) Applicant: CANON KABUSHIKI KAISHA, Tokyo (JP)

(72) Inventor: Masato Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/163,477

(22) Filed: May 24, 2016

(65) Prior Publication Data

US 2016/0352972 A1    Dec. 1, 2016

(30) Foreign Application Priority Data

May 29, 2015  (JP) ................. 2015-110211

(51) Int. Cl.
| | | |
|---|---|---|
| *H04N 1/60* | (2006.01) | |
| *H04N 1/00* | (2006.01) | |
| *H04N 1/62* | (2006.01) | |
| *H04N 1/64* | (2006.01) | |

(52) U.S. Cl.
CPC ....... *H04N 1/6008* (2013.01); *H04N 1/00453* (2013.01); *H04N 1/00485* (2013.01); *H04N 1/6013* (2013.01); *H04N 1/6019* (2013.01); *H04N 1/622* (2013.01); *H04N 1/648* (2013.01)

(58) Field of Classification Search
CPC ............ H04N 1/6008; H04N 1/00453; H04N 1/00485; H04N 1/6013; H04N 1/6019; H04N 1/622; H04N 1/648
See application file for complete search history.

(56) References Cited

U.S. PATENT DOCUMENTS

| | | | | |
|---|---|---|---|---|
| 2011/0075223 A1* | 3/2011 | Katayama | ............ | H04N 1/6033 358/3.23 |
| 2012/0075645 A1* | 3/2012 | Katayama | ............ | H04N 1/6055 358/1.9 |

FOREIGN PATENT DOCUMENTS

| | | |
|---|---|---|
| CN | 102035993 A | 4/2011 |
| CN | 101448059 B | 11/2011 |
| CN | 102790842 A | 11/2012 |
| EP | 2306700 A2 | 4/2011 |
| EP | 2434745 A2 | 3/2012 |
| JP | 2009-118419 A | 5/2009 |
| JP | 2011-114717 A | 6/2011 |

\* cited by examiner

*Primary Examiner* — Christopher D Wait
(74) *Attorney, Agent, or Firm* — Canon U.S.A., Inc. IP Division

(57) ABSTRACT

An image processing apparatus includes a first selection unit configured to select an adjustment color, a print control unit configured to cause a printer to print a chart including a patch corresponding to the adjustment color selected and patches corresponding to respective neighboring colors of the adjustment color, a second selection unit configured to select a target color from the colors corresponding to the respective patches on the chart, a generation unit configured to generate a color conversion table to the used for converting a color to be printed by the printer, by using the adjustment color selected and the target color selected, and a determination unit configured to determine an arrangement of the patches to be included in the chart to be printed by the printer, based on a color value of the adjustment color selected.

17 Claims, 11 Drawing Sheets

COLOR PATCH GENERATION FOR VISUAL SELECTION IN THE COLOR ADJUSTMENT OF A COLOR PRINT APPARATUS

BACKGROUND OF THE INVENTION

Field of the Invention

The present invention relates to an image processing apparatus and an image processing method, in particular, for updating a color conversion table based on a signal value corresponding to a color that is visually selected as a target color from a printed chart.

Description of the Related Art

In recent years, electrophotographic apparatuses that achieve image quality comparable to those in printing machines have appeared, as such apparatuses have improved in performance. Therefore, printing for purposes such as point of purchase (POP) advertising used in stores can be more easily performed at each store. The POP advertising is provided for sales promotion. In the printing for the POP advertising, an output may be printed with color different from that of a sample, due to a difference in printing apparatus or a difference in print timing. In this case, conventionally, a person such as a serviceperson with technical knowledge performs color matching by adjusting the apparatus. However, in recent years, there have been implemented systems in which a person in charge of a store can easily perform color matching, even if the person has no special technical knowledge. In this type of system, for example, a color desired to be adjusted is extracted from an image of a POP display, and patches of the respective neighboring colors of the extracted color are generated. Next, a chart where the generated patches are arranged is printed, and a user visually selects the patch of a desired color from the printed patches. Afterward, a table for color conversion updated according to the color of the selected patch (see Japanese Patent Application Laid-Open No. 2011-114717).

It is desirable that, when visually selecting the desired color, the user can easily select the patch having the desired color from the printed patches. However, in a case where an arrangement of patches is fixed irrespective of a color desired to be adjusted as in conventional cases, it is difficult to recognize a color variation between the patches, depending on the color desired to be adjusted. In such a case, it may be difficult for the user to select the desired color.

SUMMARY OF THE INVENTION

According to an aspect of the present invention, an image processing apparatus includes a first selection unit configured to select an adjustment color, a print control unit configured to cause a printer to print a chart including a patch corresponding to the adjustment color selected by the first selection unit and patches corresponding to respective neighboring colors of the adjustment color, a second selection unit configured to select a target color from the colors corresponding to the respective patches on the chart, a generation unit configured to generate a color conversion table to be used for converting a color to be printed by the printer, by using the adjustment color selected by the first selection unit and the target color selected by the second selection unit, and a determination unit configured to determine an arrangement of the patches to be included in the chart to be printed by the printer, based on a color value of the adjustment color selected by the first selection unit.

Further features of the present invention will become apparent from the following description of exemplary embodiments with reference to the attached drawings.

DESCRIPTION OF THE EMBODIMENTS

Exemplary embodiments of the present invention will be described below with reference to the drawings.

Figure 1:
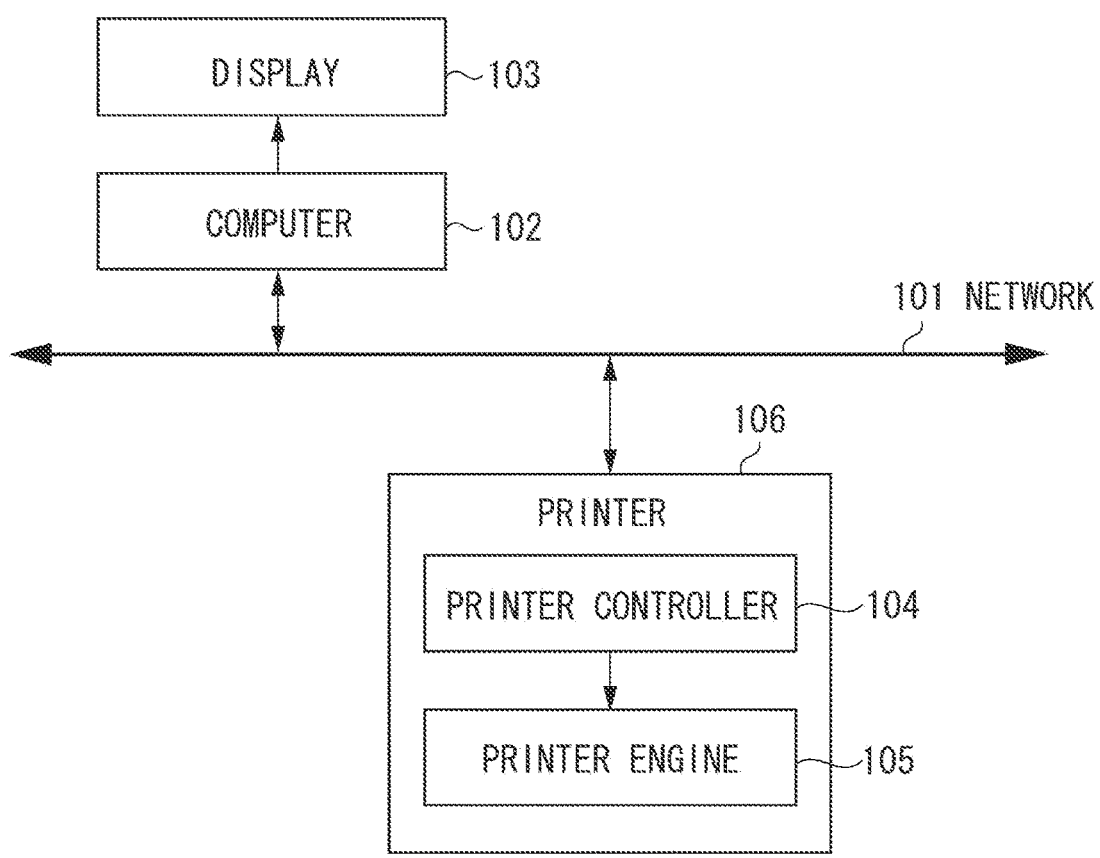
FIG. 1 is a block diagram illustrating a configuration of an image forming system including an image processing apparatus in an exemplary embodiment of the present invention.

FIG. 1 is a block diagram illustrating an example of a configuration of an image forming system including an image processing apparatus according to a first exemplary embodiment of the present invention. This image forming system includes a network 101, a computer 102, display 103, and a printer 106. The printer 106 includes a printer controller 104 and a printer engine 105. The computer 102 and the printer 106 can communicate via the network 101. For example, the computer 102 can transmit a print instruction to the printer 106, and receive information of the printer 106. The computer 102 and the display 103 are connected to each other, and the computer 102 causes screen output by transmitting screen information of a running application to the display 103. Further, the printer controller 104 and the printer engine 105 are connected to each other, and the printer controller 104 causes printer output by transmitting a control signal to the printer engine 105.

Figure 2A:
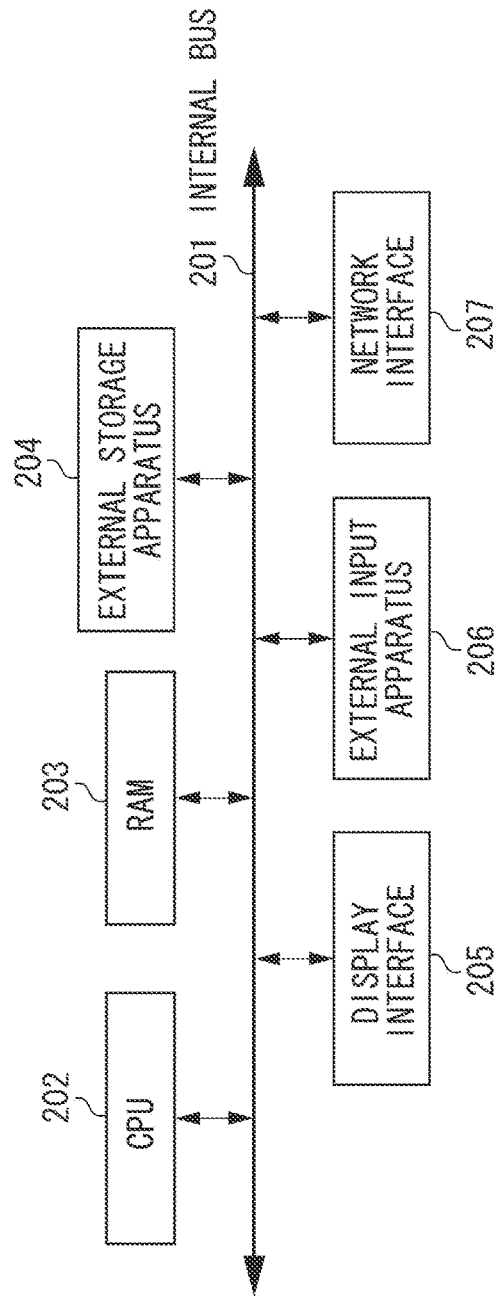
FIGS. 2A and 2B are block diagrams each illustrating a physical configuration according to an exemplary embodiment of the present invention.

FIG. 2A is a block diagram illustrating a physical configuration of the computer 102. The computer 102 includes an internal bus 201, a central processing unit (CPU) 202, a random access memory (RAM) 203, an external storage apparatus 204, a display interface 205, an external input apparatus 206, and a network interface 207. The CPU 202, the RAN 203, the external storage apparatus 204, the display interface 205, the external input apparatus 206, and the network interface 207 are connected to the network 101, and perform data communications with the printer 106. When the computer 102 is activated, the CPU 202 reads an application execution program from the external storage apparatus 204 into the RAM 203, and executes the read program. The program being executed by the CPU 202 starts transmitting screen display data to the display interface 205, thereby outputting a screen on the display 103. Further, the CPU 202 monitors user input information provided from the external input apparatus 206. When the user input information is input, the CPU 202 executes processing defined in the program and corresponding to the user input information.

Figure 2B:
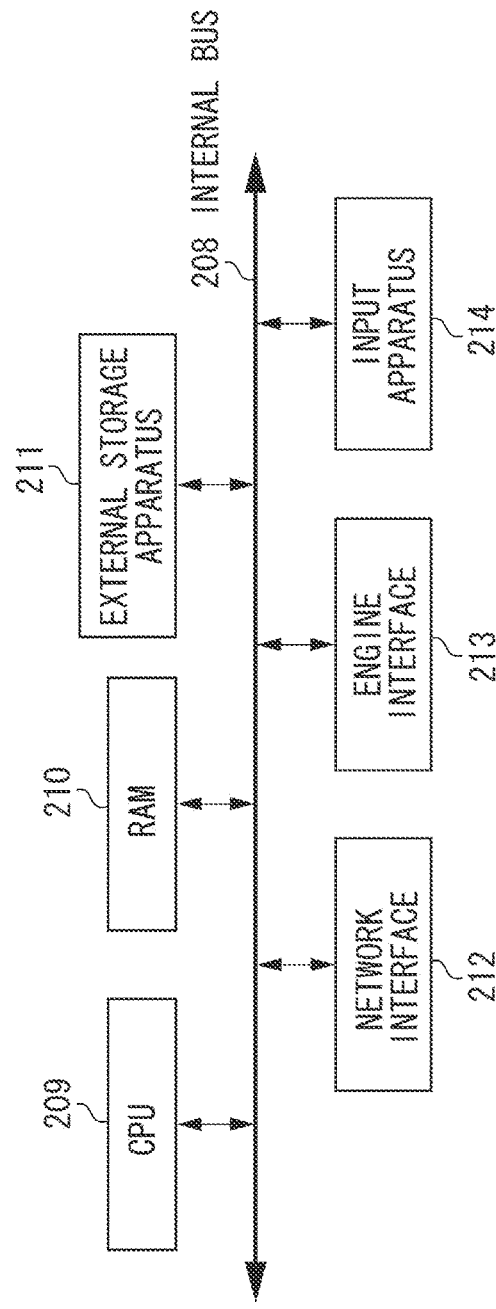

FIG. 2B is a block diagram illustrating a physical configuration of the printer controller 104. The printer controller 104 includes an internal bus 208, a CPU 209, a RAM 210, an external storage apparatus 211, network interface 212, an engine interface 213, and an input apparatus 214. The CPU 209, the RAM 210, the external storage apparatus 211, the network interface 212, the engine interface 213, and the input apparatus 214 perform data communicates with each other via the internal bus 208. When the printer controller 104 is activated, the CPU 209 reads an execution program from the external storage apparatus 211 into the RAM 210, and executes this program.

Figure 3A:
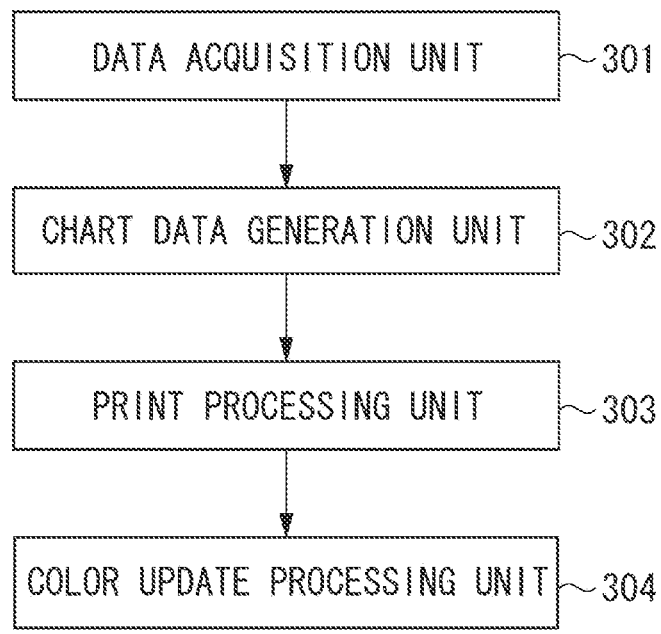
FIGS. 3A and 3B are block diagrams each illustrating a module configuration according to an exemplary embodiment of the present invention.

FIG. 3A is a block diagram illustrating a module configuration of the program executed by the CPU 202. The modules of the program executed by the CPU 202 include a data acquisition unit 301, a chart data generation unit 302, a print processing unit 303, and a color update processing unit 304. The data acquisition unit 301 acquires an adjustment-color value (an adjustment value) to be adjusted, table data necessary for chart generation, and a color conversion table. In the present exemplary embodiment, the adjustment value is assumed to be a value in a color space used in a typical monitor. Examples of the color space used in the monitor include a standard red green blue (sRGB) color space and an Adobe RGB color space. In this description, the adjustment value is assumed to be a value in the sRGB color space. Further, the color conversion table is assumed to be a table for converting the sRGB into a device-dependent RGB (devRGB) color space. This table indicates a relationship between the color value of a color displayed by the display 103 and the color value of a color formed by the printer 106.

Furthermore, the table data is necessary for processing for updating the color conversion table. This table data is assumed to be a devRGB-to-Lab conversion table. The Lab is a perceptually uniform color space, which is a three-dimensional color space formed to be device-independent considering the visual properties of humans. However, each color space to be used is not limited to those described above. The chart data generation unit 302 generates chart data, based on the data acquired by the data acquisition unit 301. The print processing unit 303 performs print control processing, which is necessary for printing the chart data generated by the chart data generation unit 302, in the printer 106. Specifically, the print processing unit 303 converts the chart data into a color space usable by the printer 106, and transmits the result of this conversion to a rendering processing unit 305 to be described below. The color update processing unit 304 acquires a target color value (a target value), and updates the color conversion table, by using the acquired target value, and the adjustment value as well as the color conversion table acquired by the data acquisition unit 301.

Figure 3B:
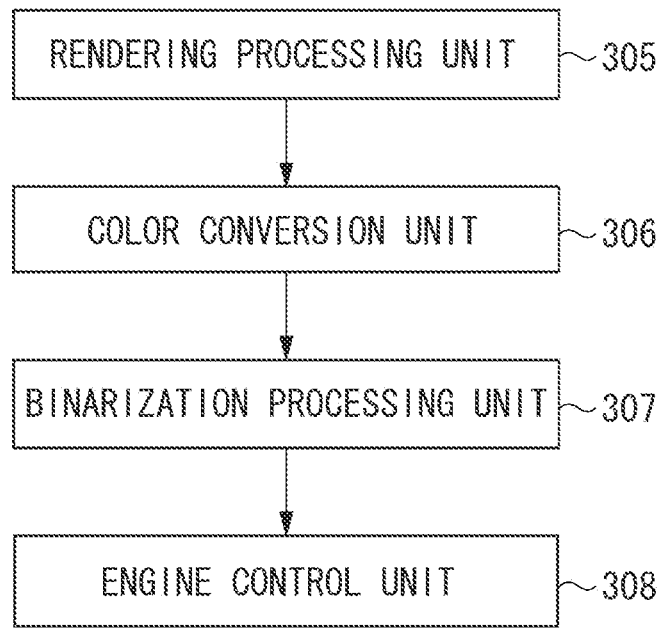

FIG. 3B is a block diagram illustrating a module configuration of the program executed by the CPU 209. The modules of the program executed by the CPU 209 include the rendering processing unit 305, a color conversion unit 306, a binarization processing unit 307, and an engine control unit 308. The rendering processing unit 305 renders image data such as the chart data converted by the print processing unit 303, in an image memory (not illustrated). The color conversion unit 306 converts the image data rendered in the image memory, into image data (cyan, magenta, yellow, and key or black (CMYK)) corresponding to color materials used by the printer engine 105. The binarization processing unit 307 converts the image data resulting from the conversion b the color conversion unit 306 into binary image data, by performing image forming processing such as screening processing and error diffusion processing. The binarization processing unit 307 then outputs the binary image data to the engine control unit 308. The engine control unit 308 outputs an instruction for performing printer engine control to the engine interface 213, based on the binary image data resulting from the conversion by the binarization processing unit 307. As a result, the printer engine 105 forms an image on a paper surface, as an ink image or toner image.

Figure 4:
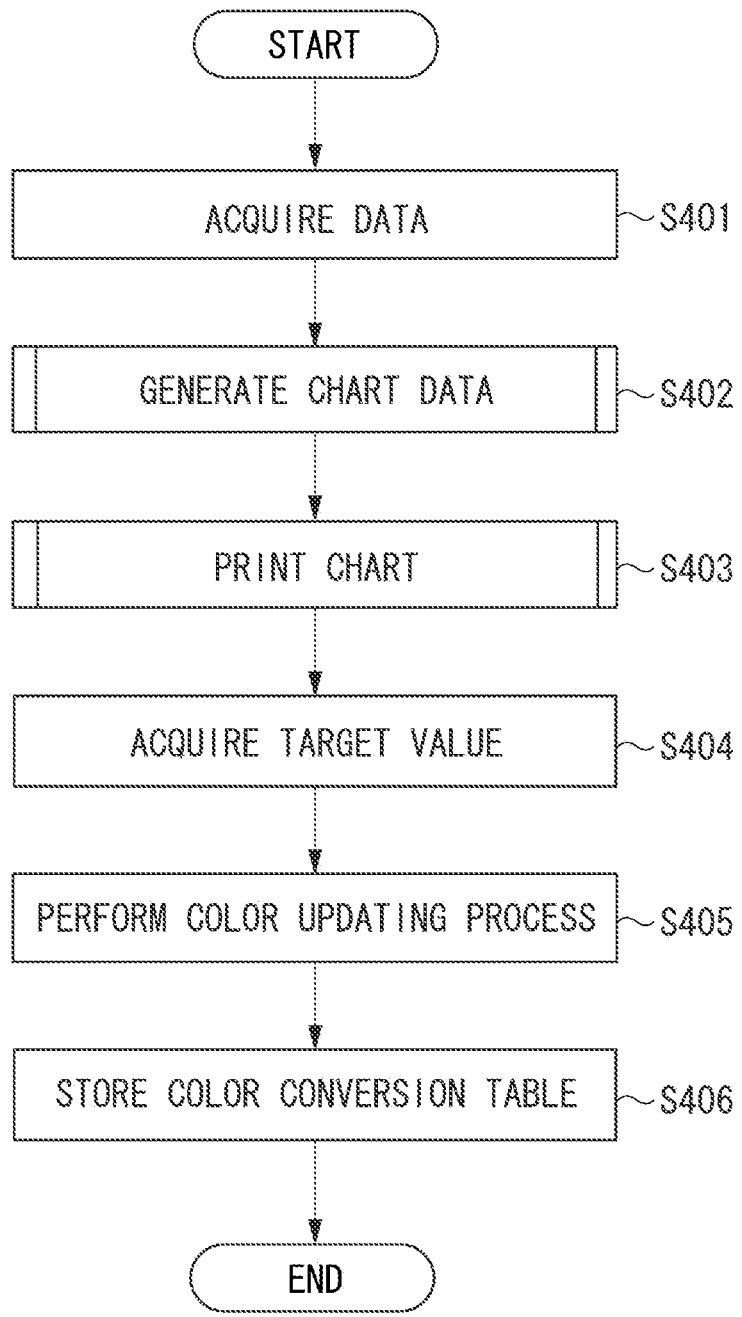
FIG. 4 is a flowchart illustrating chart generation and color updating processing according to a first exemplary embodiment.

Next, processing for updating the color conversion table will be described with reference to FIG. 4. In this processing, the target color is visually selected from a printed chart, and the color conversion table is updated based on the target value corresponding to the target color. The CPU 202 of the computer 102 performs processing in step S401, step S402, and step S404 to step S406, and the CPU 209 of the printer controller 104 performs processing in step S403, in the processing illustrated in FIG. 4.

First, in step S401, the data acquisition unit 301 acquires the adjustment-color value (the adjustment value) to be adjusted, the table data, and the color conversion table necessary for chart generation. The adjustment value may be acquired by preparing beforehand sRGB combinations corresponding to some colors, and allowing a user to select an arbitrary color combination (an sRGB combination) from the prepared combinations. Alternatively, a mechanism capable of allowing the user to input an sRGB value corresponding to the adjustment color may be adopted. Still alternatively, if there is image data of, e.g., a POP display, including a color desired to be changed, an sRGB value corresponding to the adjustment color may be acquired from the image data, to use the acquired sRGB value as the adjustment value. For example, the user may specify a color desired to be changed (the adjustment color), from an image displayed on the display 103. Subsequently, the sRGB value of the specified color may be automatically acquired to be used as the adjustment value.

The color conversion table is a table held in the external storage apparatus 204 of the computer 102 or the external storage apparatus 211 of the printer 106, to be used in printing of image data. The table necessary for the chart generation is selected from the devRGB-to-Lab conversion tables that are prepared beforehand according to the types of printer. The devRGB-to-Lab conversion tables according to the types of printer are each created as follows, for example. First, a chart dedicated to table creation is printed by a printer. Next, a Lab value is acquired by measuring the printed chart, and a devRGB value is associated with the acquired Lab value.

Subsequently, in step S402, the chart data generation unit 302 generates the chart data based on the data acquired in step S401. This chart generation will be described below in detail.

In step S403, the print processing unit 303 prints the chart, based on the chart data generated in step S402. This print processing will be described below in detail.

The color update processing unit 304 then performs step S404 to step S406. In step S404, first, the user selects the patch of the target color from the chart printed in step S403. The color update processing unit 304 then acquires the target value corresponding to this color, by receiving the result of the selection made by the user. The target value is acquired as follows, for example. First, an image of the chart printed using the chart data (sRGB) generated in step S402 is displayed on the display 103. The displayed image of the chart and the printed chart are identical in terms of patch array. The user then selects a patch from the chart displayed on the display 103. The selected patch is at the same position as the position of a patch desired to be selected as the target color for the adjustment color from the patches on the printed chart. The target value corresponding to the adjustment value is thereby acquired. Alternatively, the coordinate position of each patch may be added to the chart when the chart is printed, and the coordinate position of the selected patch may be input. In this case, the displayed image of the chart and the printed chart may not be identical in terms of patch array.

Next, in step S405, color updating processing is performed using the adjustment value and the color conversion table acquired in step S401, and the target value acquired in step S404. In the color updating processing, a part of the color conversion table is updated in such a manner that an output value when the adjustment value is converted using the color conversion table is identical to an output value when the target value is converted using the color conversion table. For example, assume that the sRGB value of the adjustment value is (150, 0, 0), and the devRGB value of the output value resulting from color conversion using the color conversion table before update is (120, 0, 0). Further, assume that the sRGB value of the target value selected by the user is (150, 20, 0), and the devRGB value of the output value after the color conversion is (120, 15, 0). In this case, the color conversion table for sRGB (an arbitrary color space) to devRGB (a device-dependent color space) conversion is updated, in such a manner that the output value of the sRGB value (150, 0, 0) of the adjustment value is identical to the devRGB value (120, 15, 0) of the output value after the color conversion. Saturated color or gradation steps may occur in the color conversion table after update, depending on the target value. Therefore, smoothing processing can be performed for the neighboring colors of the updated part of the color conversion table.

Lastly, in step S406, the color conversion table updated in step S405 is stored into the external storage apparatus 204 of the computer 102 or the external storage apparatus 211 of the printer 106. The updated color conversion table may be stored by overwriting the color conversion table acquired in step S401, or may be stored as a different color conversion table.

Next, the chart data generation processing in step S402 will be described in detail with reference to FIG. 6. As described above, the chart data generation unit 302 performs the chart data generation processing and thus performs processing in all of steps in FIG. 6.

In step S601, the adjustment value acquired in step S401 is acquired. Next, in step S602, the color conversion table and the table data necessary for the chart generation acquired in step S401 are acquired.

In step S603, a table for converting each of the adjustment value and the target value into the Lab value is sRGB-to-Lab conversion table) is generated. The sRGB-to-Lab conversion table is generated by combining the color conversion table (the sRGB-to-devRGB conversion table) with the table necessary for the chart generation (the devRGB-to-Lab conversion table), which are acquired in step S602. The combining is performed using, for example, interpolation calculation. In the interpolation calculation, when a value not defined in a calculation table is input, interpolation is performed using a value that is defined in the calculation table and close to the input value. Examples of the interpolation calculation include tetrahedral interpolation. In the tetrahedral interpolation, interpolation calculation is performed using four values, which are defined in a calculation table and close to an input value. In the present processing, an input is assumed to be a devRGB value in the sRGB-to-devRGB conversion table, and the sRGB-to-Lab conversion table is generated by performing calculation for the tetrahedral interpolation, using the devRGB-to-Lab conversion table as the calculation table. In the present exemplary embodiment, the tetrahedral interpolation is used for the combining, but the combining is not limited to this interpolation. Any method may be used if the sRGB-to-Lab conversion table can be generated from the sRGB-to-devRGB conversion table and the devRGB-to-Lab conversion table.

In step S604, the adjustment value is converted into the Lab value. In this conversion, the sRGB value of the adjustment value is converted into the Lab, by using the sRGB-to-Lab conversion table generated in step S603. This conversion is executed by performing the tetrahedral interpolation, using the input, as the adjustment value, and the sRGB-to-Lab conversion table as the calculation table.

In step S605, based on the Lab value of the adjustment value generated in step S604, a Lab value for generating a patch to be a candidate (a candidate patch) for selecting the target value is generated. The Lab value of the candidate patch is generated by combining values that are obtained by converting each of L, a, and b values stepwise, based on the Lab value of the adjustment value. The L, a, and b values are generated using the following expression 1.

$Li = Lb + i \times \text{Dist}$ $ai = ab + i \times \text{Dist}$ $bi = bb + i \times \text{Dist}$ $(-n \leq i \leq n)$  (Expression 1)

In the expression (1), "Lb", "ab", and "bb" represent the Lab value of the adjustment value, represents a value (an integer value) that varies stepwise according to the number of candidate patches to be generated, and "Dist" represents a distance between the candidate patches in the Lab color space. For example, assume that the Lab value of the adjustment value is (50, 0, 0), 27 patches are generated, and "Dist" is 1. In this case, three patches are created in each of the L, a, and b directions, and thus, "i" assumes −1, 0, and 1. Therefore, "Li" assumes 49, 50, and 51, "ai" assumes −1, 0, and 1, and "hi" assumes −1, 0, and 1. By combining all these values, candidate-patch Lab values are generated. These candidate-patch Lab values each correspond to a neighboring value of the Lab value of the adjustment value, and the color of each of the candidate patches is expressed by a neighboring color of the adjustment color. The patch of the neighboring color will be hereinafter referred to as "candidate patch".

In step S606, chroma and hue of the adjustment value are calculated from the adjustment value (the Lab value). The chroma is determined by the following expression.

$C = \text{sqrt}(a^2 + b^2)$  (Expression 2)

In the expression (2), "C" represents the chroma, "a" and "b" represent the a and b values of the Lab, and "sqrt"

represents calculation of a square root. Further, the hue is determined by the following expression.

$$H = \mathrm{atan}(b, a) \times 180/PI \quad \text{(Expression 3)}$$

Here, H represents the hue, and "b" represent the a and b values of the Lab, "PI" represents the ratio of the circumference of a circle to the diameter, and "atan" represents calculation of an arc tangent.

Subsequent step S607 to step S611 correspond to processing concerning an arrangement of the candidate patches generated in step S605. In the present exemplary embodiment, the arrangement of the candidate patches in the chart are determined according to the color value of the adjustment color, for making it easy to select a patch having the target color from the candidate patches. The target color is visually selected by the user, as described above with reference to step S404 in FIG. 4. Therefore, the candidate patches can be arranged considering the visual properties of humans. The visual properties of humans include being more insensitive to a change in the chroma than to a change in the luminance, being more insensitive to a change in the hue than to a change in the chroma, and being more insensitive to a change as the luminance is higher. In addition, when comparing two colors, the more difficult it is to recognize a change, the further the two colors are arranged. Therefore, based on these properties, patches, for which the user is likelier to become insensitive to (has more difficulty recognizing) a color difference, are arranged closer.

In step S607, it is determined whether the L value of the adjustment value (the Lab value) is equal to or higher than a threshold. A predetermined value is used as the threshold. For example, when the L value is 0 to 100 and the higher value is brighter, the determination is performed using a value of 50 as the threshold. The threshold may the set beforehand, or may the dynamically set according to, for example, the features of an image such as a POP display desired to be changed in color or the properties of a printer that performs printing.

Figure 7:
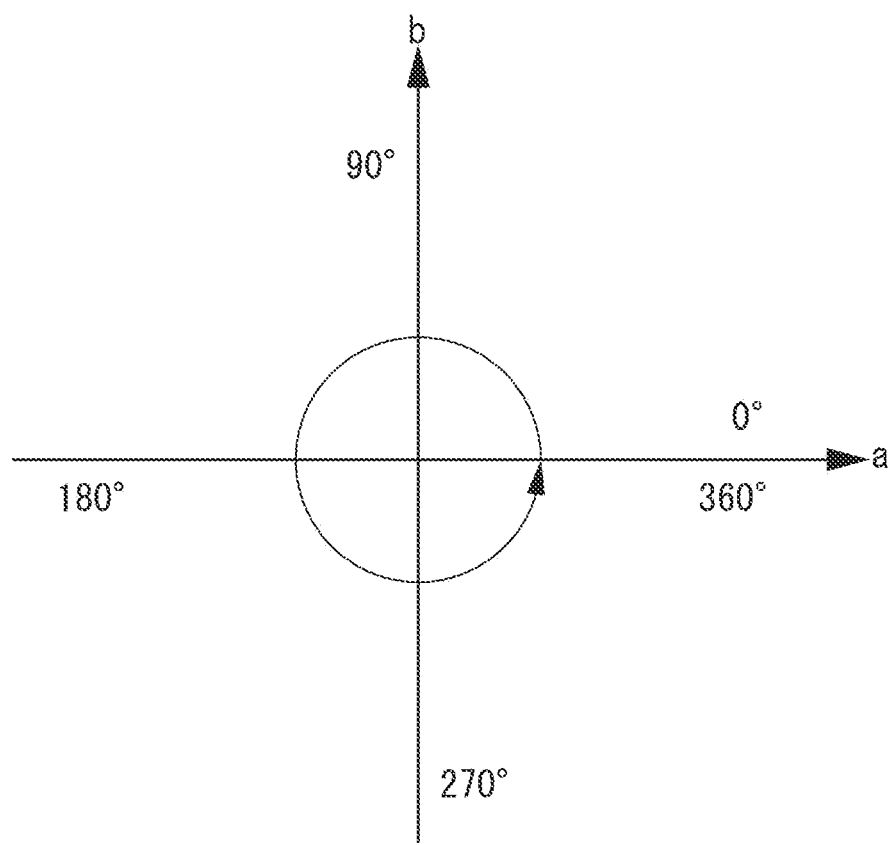
FIG. 7 is a diagram illustrating a hue expression method according to the first exemplary embodiment.

If it is determined that the L value of the adjustment value is equal to or higher than the threshold (YES in step S607), the processing proceeds to step S608. In step S608, it is determined whether the adjustment value (the Lab value) is close to an a-axis in the Lab color space. This determination is performed using the hue (H) calculated in step S606. As illustrated in FIG. 7, the hue is expressed in such a form that, when the a-axis is assumed to be a horizontal axis and a b-axis is assumed to be a vertical axis, the value increases counterclockwise from the a-axis that is 0 degrees. Therefore, the adjustment value is determined to be close to the a-axis, if a condition of 0°≤H<45°, or 135°≤H<225°, or 315°≤H<360° is satisfied.

Figure 8A:
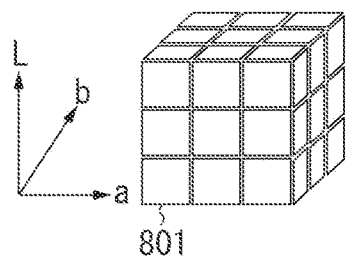
FIGS. 8A, 8B, 8C, and 8D are diagrams each illustrating an image of patch generation and arrangement according to the first exemplary embodiment.
Figure 8B:
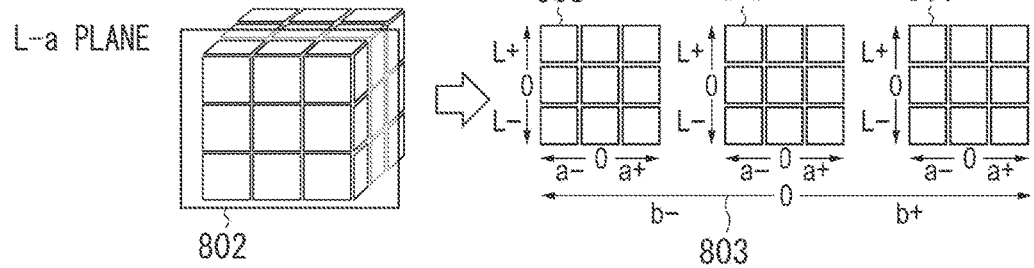
Figure 8C:
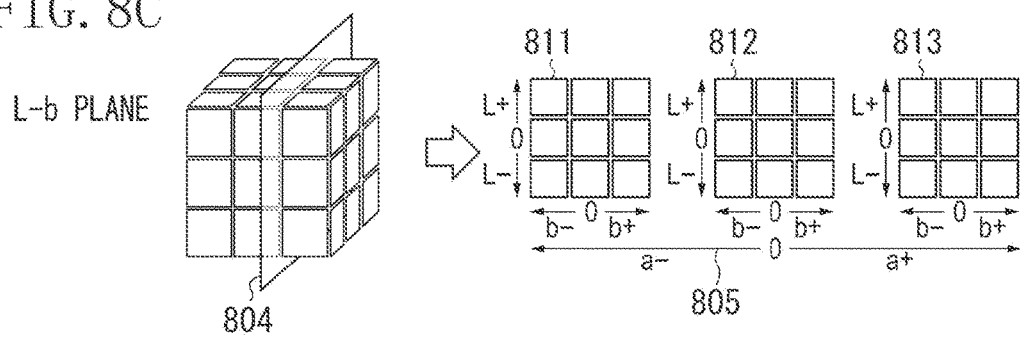
Figure 8D:
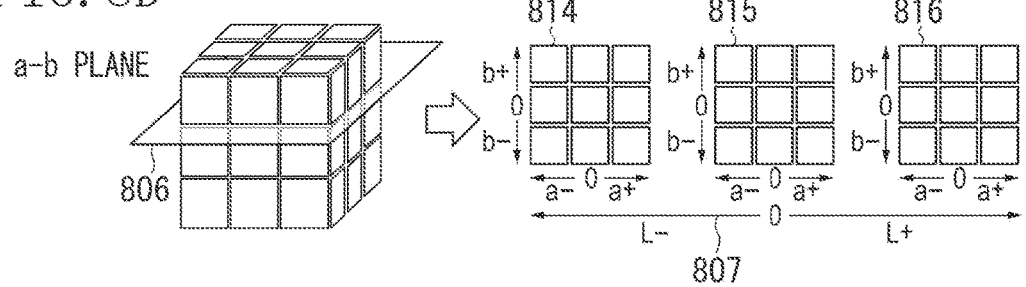

If it is determined that the adjustment value is close to the a-axis, i.e., the hue falls within the range of the threshold (YES in step S608), the processing proceeds to step S609. In step S609, the patch arrangement is performed using an L-b plane as a reference. Here, the patch arrangement using the L-b plane as the reference will be described. For example, assume that the above-described "n" is 1, i.e., 27 patches in total are generated. In this case, as illustrated in FIG. 8A, each of the Lab values of the respective candidate patches generated in step S605 can be expressed by an image of each of small cubes forming a cube 801 in the Lab color space. The cube 801 is segmented by a plane perpendicular to any one of the b-axis, the a-axis, and the L-axis, such as a plane 802 in FIG. 8B, a plane 804 in FIG. 8C, and a plane 806 in FIG. 8D.

Next, the candidate patches forming one plane are arranged as one patch group, and the patches are arranged by aligning the patch groups to form each of arrangements 803, 805, and 807. The chart data allowing such a patch arrangement is generated.

In another words, the patch arrangement using the L-b plane as the reference is as follows. First, the candidate patches expressed by a cube three-dimensional form) in the Lab color space are segmented by a plane perpendicular to the a-axis. Next, the candidate patches in the L-b plane are formed as one patch group, and patch groups each corresponding to such a patch group are arranged in the chart.

Patch groups 808 to 810 include the candidate patches in an L-a plane. The patch groups 808 and 810 each have values obtained by moving each candidate patch of the patch group 809 along the b-axis direction.

Further, patch groups 811 to 813 include candidate patches in the L-b plane. The patch groups 811 and 813 each have values obtained by moving each candidate patch of the patch group 812 along the a-axis direction. Similarly, patch groups 814 to 816 include candidate patches in an a-b plane. The patch groups 814 and 816 each have values obtained by moving each candidate patch of the patch group 815 along the L-axis direction.

Figure 11:
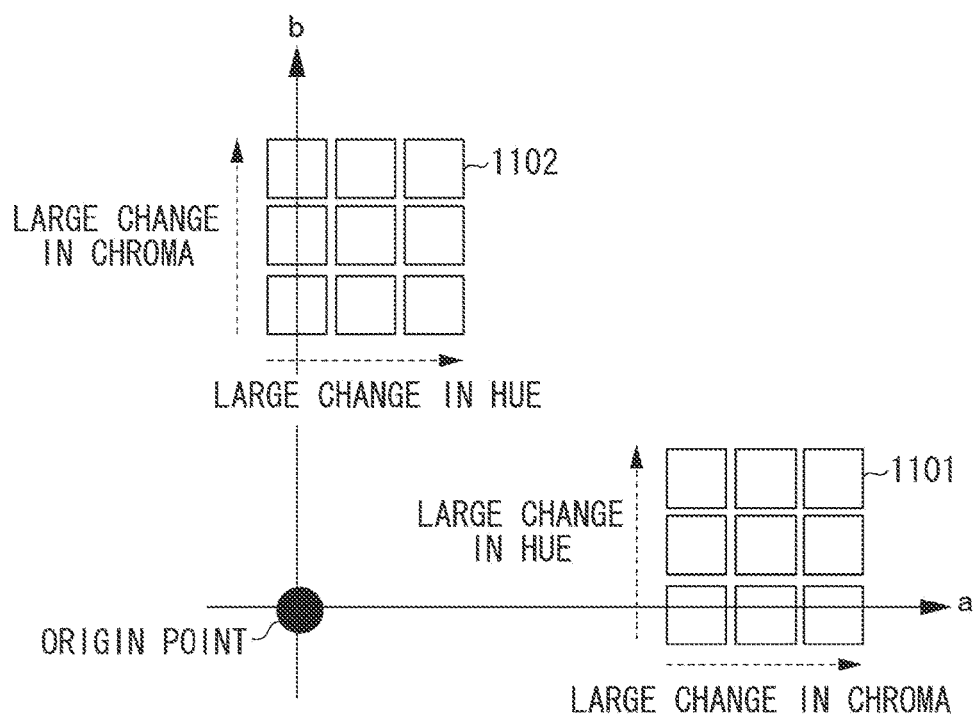
FIG. 11 is a diagram illustrating details of a patch arrangement according to the first exemplary embodiment.

There is a reason for arranging the patches using the L-b plane as the reference when the adjustment value (the Lab value) is close to the a-axis, and this reason will be described with reference to FIG. 11. FIG. 11 is a diagram illustrating the candidate patches in the a-b plane of the Lab space. FIG. 11 illustrates two examples. One is a case where the adjustment value (the Lab value) is close to the a-axis (candidate patches 1101), and the other is a case where the adjustment value (the Lab value) is close to the b-axis (candidate patches 1102). In FIG. 11, the chroma is determined based on a distance from an origin point, which is the intersection of the a-axis and the b-axis in the a-b plane, to a patch. Further, in FIG. 11, the hue is determined, based on the angle of a patch when the a-axis in the a-b plane is assumed to be zero degrees.

The candidate patches 1101 in FIG. 11 represent an example of the candidate patches when the adjustment value (the Lab value) is close to the a-axis. As for the candidate patches 1101, the distance from the origin point greatly varies between the adjacent patches among the patches aligned in a direction parallel to the a-axis. Further, the angle from the a-axis greatly varies between the adjacent patches among the patches aligned in a direction parallel to the b-axis.

Therefore, of the candidate patches 1101 in the case where the adjustment value (the Lab value) is close to the a-axis, a change in the chroma is large between the adjacent patches among the patches aligned in the direction parallel to the a-axis. Further, a change in the hue is large between the adjacent patches among the patches aligned in the direction parallel to the b-axis.

Moreover, as described above, it is more difficult to recognize a change in the hue than to recognize a change in the chroma.

Therefore, it is more difficult to recognize a change in the patches arranged in the L-b plane where a change in the hue is large, than to recognize a change in the patches arranged in the L-a plane where a change in the chroma is large, among the candidate patches 1101.

As described above, the patches in which a change is more difficult to recognize can be arranged closer, because it is easier for the user to visually recognize color difference between the patches in this arrangement.

Accordingly, when the adjustment value (the Lab value) is close to the a-axis, the candidate patches having a change in the b-axis are arranged closer. In other words, the patch arrangement is performed using the L-b plane as the reference.

If it is determined that the adjustment value is not close to the a-axis (NO in step S608), the processing proceeds to step S610. In step S610, the patch arrangement is performed using the L-a plane as the reference. This arrangement is performed in a manner similar to that in the case where the arrangement is performed using the L-b plane as the reference.

The candidate patches 1102 illustrated in FIG. 11 represent an example of the candidate patches in the case where the adjustment value (the Lab value) is close to the b-axis.

As for the candidate patches 1102, the distance from the origin point greatly varies between the patches aligned in the direction parallel to the b-axis, and the angle from the a-axis greatly varies between the patches aligned in the direction parallel to the a-axis. Therefore, when the adjustment value (the Lab value) is close to the b-axis, a change in the chroma is large in the direction parallel to the b-axis, and a change in the hue is large in the direction parallel to the a-axis, as represented by the candidate patches 1102 in FIG. 11. As described above, it is more difficult to recognize a change in the hue than to recognize a change in the chroma. Therefore, it is more difficult to recognize a change in the patches aligned in the L-a plane where a change in the hue is large, than to recognize a change in the patches aligned in the L-b plane where a change in the chroma is large. As described above, the patches in which a change is more difficult to recognize can be arranged closer.

Therefore, when the adjustment value (the Lab value) is close to the b-axis, the candidate patches having a change in the a-axis are arranged closer. In other words, the patch arrangement is performed using the L-a plane as the reference.

If it is determined that the L value of the adjustment value (the Lab value) is not equal to or higher than the threshold (NO in step S607), the processing proceeds to step S611. In step S611, the patch arrangement is performed using the a-b plane as the reference. This arrangement is performed in a manner similar to that in the case where the arrangement is performed using the L-b plane as the reference.

The a-b plane is used as the reference when it is determined that the L value is not equal to or higher than the threshold, i.e., when the L value is low. This is because it is relatively easy to recognize a change in the L value when the L value is low, even if the patches are distant. Therefore, the a-b plane, in which mainly the chroma and the hue vary, is used as the reference.

In step S612, candidate-patch exclusion processing is performed. In this processing, the candidate patch falling outside a printer color reproduction range is excluded from the candidate patches generated and arranged in or before step S611. The candidate patches are generated in the Lab color space, i.e., in the device-independent color space. Therefore, the candidate patch falling outside the printer color reproduction range may be generated. The candidate patch falling outside the printer color reproduction range is rounded to the color range reproducible by the printer. Therefore, in the present exemplary embodiment, such a patch is excluded. The candidate-patch exclusion processing may be performed in any method, if the method prevents the candidate patch, which is determined to fall outside the color reproduction range, from being selected as the target value. Further, determination as to whether the candidate patch falls outside the color reproduction range is performed based on whether the Lab value of each candidate patch is included in the range of the Lab values of the devRGB-to-Lab conversion table acquired in step S602. Specifically, this determination is performed by determining whether the Lab value of the candidate patch is present in a tetrahedron in the Lab color space. The tetrahedron is formed of an arbitrary Lab value and three neighboring Lab values thereof in the devRGB-to-Lab conversion table. Whether the candidate patch is present is determined for all the tetrahedrons that can be formed using the Lab values of the devRGB-to-Lab conversion table. If the candidate patch is determined to be absent in all the tetrahedrons, this candidate patch is determined to fall outside the color reproduction range.

In the present exemplary embodiment, this determination is performed by the method using the tetrahedron that can be formed from the devRGB-to-Lab conversion table. However, any method may be employed, if the method can extract the printer color reproduction range and determine whether the candidate patch falls outside the color reproduction range.

In step S613, the candidate patches generated and arranged as the Lab values are each converted into the sRGB value. The conversion from the Lab value to the sRGB value is performed by signal search processing using the sRGB-to-Lab conversion table generated in step S603. In the signal search processing, first, the tetrahedral interpolation is performed, using all the signal value combinations of the sRGB values of 0 to 255 as the input, and using the sRGB-to-Lab conversion table as the calculation table. Of all the Lab values calculated by the tetrahedral interpolation, a Lab value closest to the Lab value of an arbitrary candidate patch is extracted. The sRGB value corresponding to the extracted Lab value is then determined to be the sRGB value of the candidate patch. The candidate patches generated and arranged as the Lab values are each converted into the sRGB value, by performing this signal search processing for all the candidate patches. In the present exemplary embodiment, the signal search processing is used, but the conversion is not limited to this processing. For example, the Lab value of the candidate patch may be converted into the sRGB value, by creating a reverse table of the sRGB-to-Lab conversion table (i.e., a Lab-to-sRGB conversion table).

Lastly, in step S614, the candidate patches of the sRGB values generated in step S613 are transmitted to the print processing unit 303, as one chart.

Figure 5:
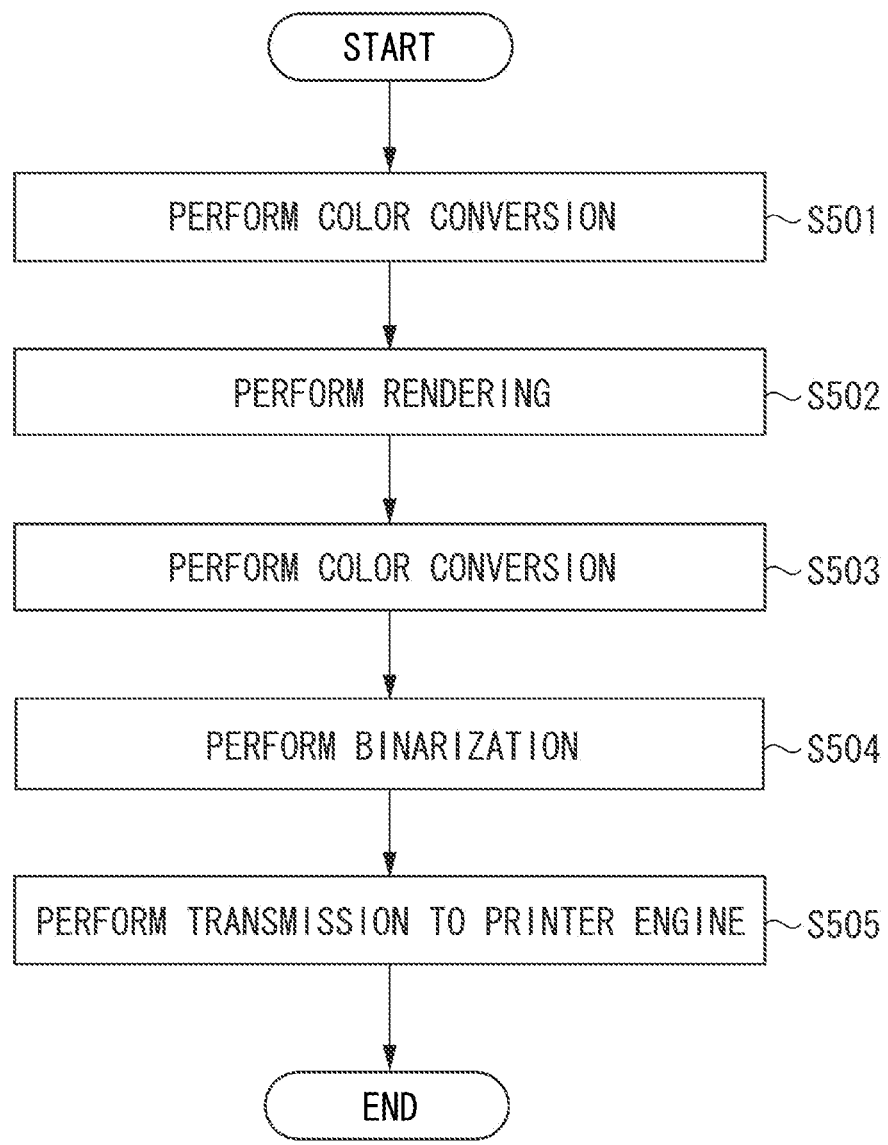
FIG. 5 is a flowchart illustrating print processing according to the first exemplary embodiment.

Next, the chart print processing in step S403 will be described in detail with reference to FIG. 5. First, in step S501, the chart data generation unit 302 performs color conversion of the chart data generated in step S402, by using the color conversion table acquired in step S401. In other words, the chart data generation unit 302 converts the chart data from the sRGB into the devRGB color space. The chart data generation unit 302 then transmits the chart data after the color conversion, to the rendering processing unit 305. In step S502, the rendering processing unit 305 renders the image data in the image memory, according to the chart data received from the chart data generation unit 302. The rendering processing unit 305 then transmits the image data rendered in the image memory, to the color conversion unit 306. In step S503, the color conversion unit 306 converts the image data into the CMYK data, by using a look-up table (LUT) for conversion from the devRGB stored beforehand in the external storage apparatus 211 to the CMYK. The color conversion unit 306 then transmits the CMYK data to the binarization processing unit 307. In step S504, the binarization processing unit 307 converts the received chart data resulting from the color conversion into the binary image data, by performing the image forming processing such as the screening processing and the error diffusion processing. The binarization processing unit 307 then outputs the binary image data to the engine control unit 308. In step S505, the engine control unit 308 outputs the instruction for performing the printer engine control to the engine interface 213, based on the binary image data resulting from the conversion in step S504, to the engine interface 213. This allows the printer engine 105 to form the chart where the candidate patches are printed on a paper sheet as an ink image or toner image. The user visually selects the patch having the desired color from the patches printed on this chart. The color conversion table allowing the adjustment color to be the target color is then generated, assuming the color of the selected patch to be the target color.

By performing the above-described processing, when the user visually selects the desired color (the target color) from the printed chart, the patches are arranged to allow easy recognition of a color variation between the patches printed on the chart, even if the color desired to be adjusted is any color. Therefore, the chart, from which the user can easily select the patch of the desired color, can be printed.

In the configuration described above, the computer 102 in FIG. 1 performs the processing except for the chart print processing (step S403) of the present exemplary embodiment. However, the printer controller 104 alone may perform these processing.

A second exemplary embodiment, of the present invention will be described below. In the first exemplary embodiment, based on the luminance, the chroma, and the hue of the adjustment value, the patch arrangement is performed using any one of the L-a plane, the L-b plane, and the a-b plane in the Lab color space, as the reference. However, the patches are arranged at distant positions, in the direction parallel to the b-axis if the L-a plane is used, the a-axis if the Lb plane is used, and the L-axis if the a-h plane is used.

There may be no problem if the total number of the patches is on the order of 27 as in the example described in the first exemplary embodiment. However, the larger the number of the patches to be generated is, the larger the number of the patches forming one patch group is, and therefore, the longer the distance between the patch groups is. This makes it more difficult to recognize a color variation between the patches. Therefore, if the number of the patches is large, the patches are arranged in such a manner that the luminance, the chroma, and the hue each change stepwise based on the adjustment color, for allowing the user to compare differences between the patches easily.

Therefore, in a second exemplary embodiment, the patches are arranged in such a manner that the L, a, and b values each change stepwise, based on the adjustment value (the Lab value). This makes it easy to select the patch of the desired color even if the total number of the patches is large. A method for thus arranging the patches will be described below.

Figure 9:
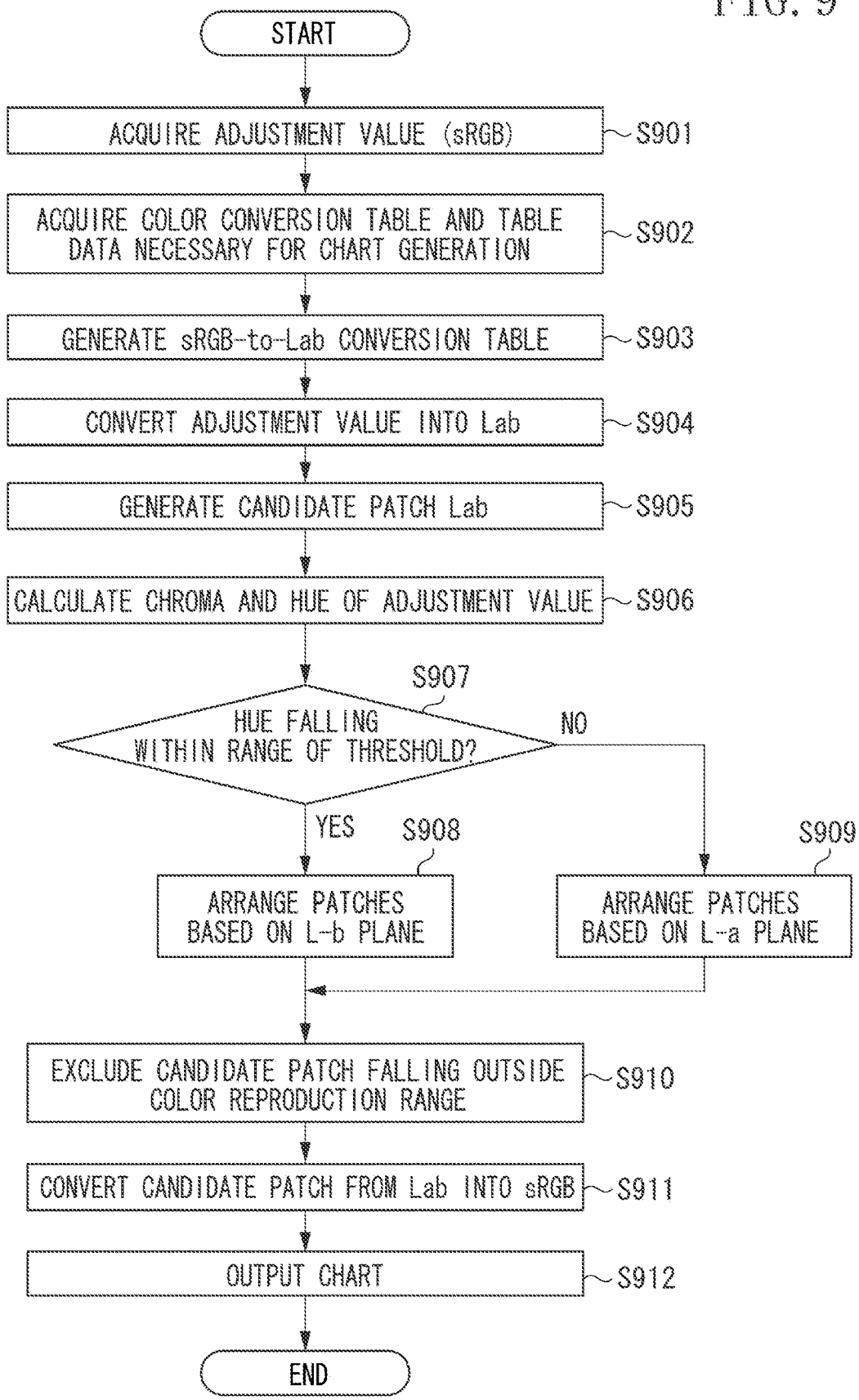
FIG. 9 is a flowchart illustrating chart generation processing according to a second exemplary embodiment.

Physical configurations and a system configuration in the present exemplary embodiment are similar to those in the first exemplary embodiment and therefore will not be described. In addition, processing similar to the processing, except for the chart data generation processing in step S402 in FIG. 4 in the first exemplary embodiment, are performed in the present exemplary embodiment. The chart data generation processing in the present exemplary embodiment will be described in detail with reference to FIG. 9. As with the first exemplary embodiment, the chart data generation unit 302 performs all of processing in FIG. 9.

Figure 6:
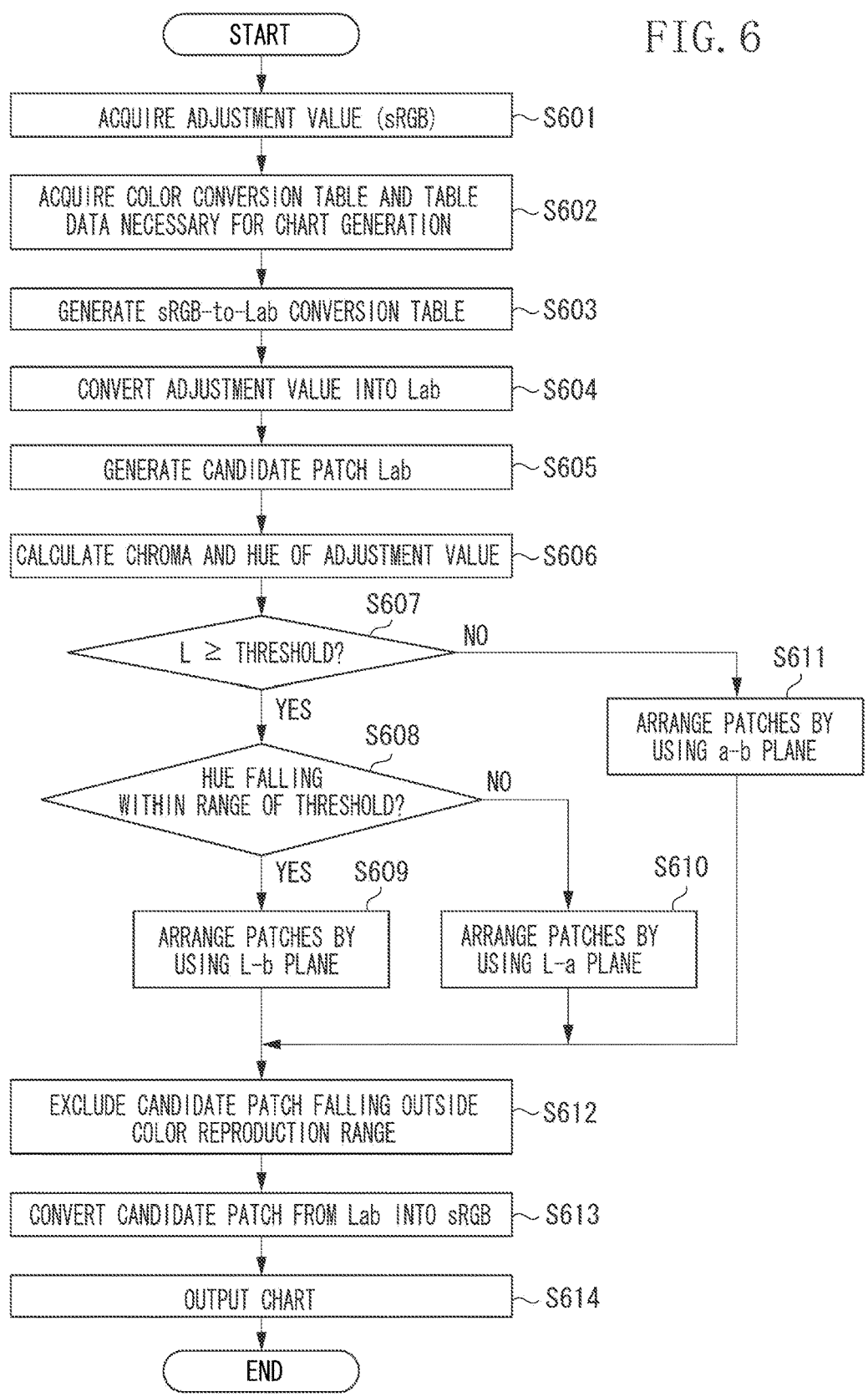
FIG. 6 is a flowchart illustrating chart generation processing according to the first exemplary embodiment.

Step S901 to step S906 are similar to step S601 to step S606 in FIG. 6 and therefore will not be described.

In step S907, it is determined whether the Lab value of the adjustment value is close to the a-axis in the Lab color space. This determination is performed based on the hue of the adjustment value, as with the processing in step S608 in FIG. 6.

Figure 10A:
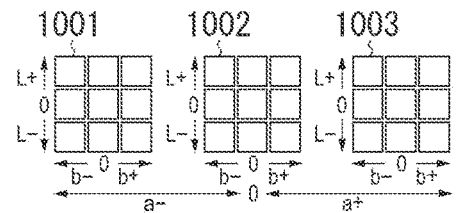
FIGS. 10A, 10B, 10C, 10D, and 10E are diagrams illustrating an outline of a patch arrangement method according to the second exemplary embodiment.
Figure 10B:
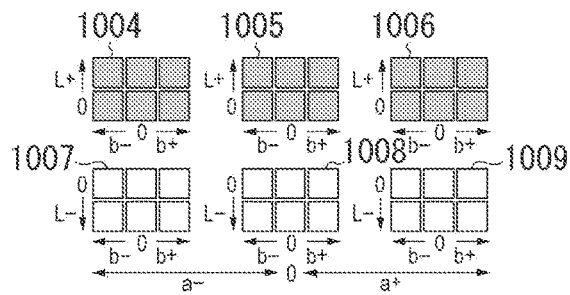

If it is determined that the hue falls within the range of the threshold (YES in step S907), the processing proceeds to step S908. In step S908, the patch arrangement is performed based on the L-b plane. A method for arranging the patches based on the L-b plane will be described with reference to FIGS. 10A to 10E. First, the patch arrangement is performed based on the L-b plane in a manner similar to step S609 of the first exemplary embodiment, as illustrated in FIG. 10A. Next, each of planes 1001, 1002, and 1003 in FIG. 10A is segmented based on the patch having the same L value as the L value of the adjustment value. In the present exemplary embodiment, a space equivalent to one patch is inserted between the segmented patches, as illustrated in FIG. 10B. The space to be inserted is not limited to the size of one patch, and may be changed according to, for example, the total number of the patches.

Figure 10C:
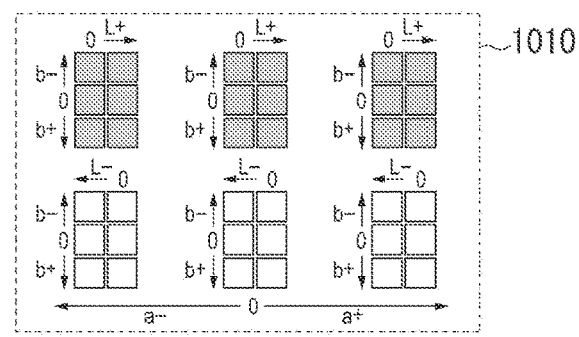
Figure 10D:
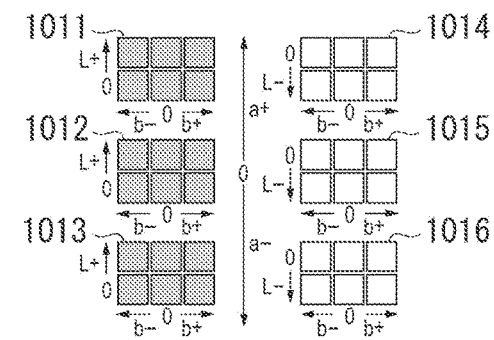

Specifically, a patch group (each of patch groups 1004, 1005, and 1006), which includes the patch having the same L value as the L value of the adjustment value, and the patches having the L values in a direction positive with respect to this L value, is generated as a block. A patch group (each of patch groups 1007, 1008, and 1009), which includes the patch having the same L value as the L value of the adjustment value, and the patches having the L values in a direction negative with respect to this L value, is also generated as a block. Next, the patches are arranged by inserting the space for one patch between the generated blocks. The generated patch groups (the patch groups 1004, 1005, 1006, 1007, 1008, and 1009) are then individually rotated clockwise by 90 degrees, as illustrated in FIG. 10C. The individually rotated patch groups are then rotated counterclockwise by 90 degrees as one set (a set 1010), as illustrated in FIG. 10D. Next, patch group (each of patch groups 1017, 1018, 1019, and 1020) is generated as a small block, by segmenting the patch group (each of the patch groups 1012 and 1015) having the same a value as the a value of the adjustment value, based on the patch having the same b value as the b value of the adjustment value. A patch having the same value as the adjustment value is inserted between the generated patch groups (i.e., between the patch groups 1017 and 1018, and between the patch groups 1019 and 1020). In the present exemplary embodiment, the patch to be inserted is assumed to have a size of one patch in the b direction and the number of patches (two) equal to one side of the small block in the L direction.

Figure 10E:
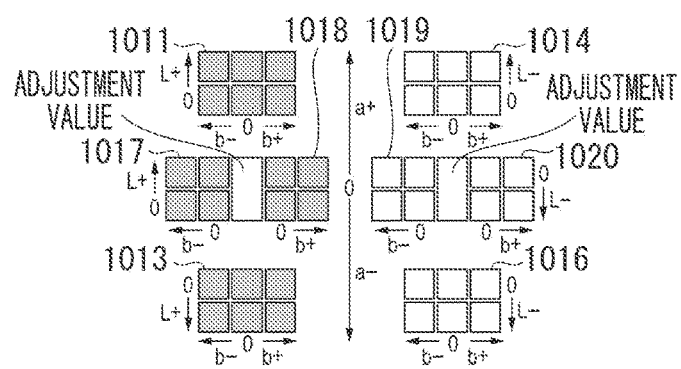

The patch to be inserted is not limited to the above-described size, and may be changed according to, for example, the total number of the patches. Lastly, in the patch group 1013, the patch having the same L value as the L value of the adjustment value and the patch having the L value positive in the L direction with respect to this L value are interchanged. Further, in the patch group 1014, the patch having the same L value as the L value of the adjustment value and the patch having the L value negative in the L direction with respect to this L value are interchanged. In this way, the patch arrangement is performed based on the L-b plane, as illustrated in FIG. 10E.

If it is determined that the hue does not fall within the range of the threshold (NO in step S907), the processing proceeds to step S909. In step S909, the patch arrangement is performed based on the L-a plane. The patch arrangement based on the L-a plane is performed in a manner similar to that in the patch arrangement based on the L-b plane.

Step S910 to step S912 are similar to step S612 to step S614 in FIG. 6 and therefore will not be described.

By performing the above-described processing, the patches can be arranged in such a manner that the luminance, the chroma, and the hue change stepwise, based on the color patch of the adjustment value. In other words, the patches can be arranged to achieve a gradual visual change from the color patch of the adjustment value in the center. Therefore, the patch of the desired color can be selected, even if the number of the generated patches is large.

In the present exemplary embodiment, the computer 102 in FIG. 1 is assumed to perform the processing except for the chart print processing (step S403), as with the first exemplary embodiment. However, the printer controller 104 alone may perform these processing.

In the present image processing apparatus, a color variation between the patches can be readily recognized by determining the patch arrangement according to the color desired to be changed. Therefore, the user can easily select the desired color.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110211, filed May 29, 2015, which is hereby incorporated by reference herein in its entirety.

What is claimed is:

1. An image processing apparatus comprising:
 one or more memories storing instructions; and
 one or more processors that, when executing the instructions, causes the image processing apparatus to implement:
 performing first selection for selecting an adjustment color;
 performing print control for causing a printer to print a chart including a patch corresponding to the adjustment color selected by the first selection and patches corresponding to respective neighboring colors of the adjustment color;
 performing second selection for selecting a target color from the colors corresponding to the respective patches on the chart;
 generating a color conversion table to be used for converting a color to be printed by the printer, by using the adjustment color selected in the first selection and the target color selected by the second selection; and
 determining arrangement of the patches included in the chart printed by the printer based on a Lab value of the adjustment color selected by the first selection,
 wherein, in the determining, the arrangement of the patches is determined by
 in a case where an L value of the Lab value of the adjustment color is greater than a threshold, placing a patch that has a changed Lab value, in which at least one of the L value and an a value of the Lab value of the adjustment color is changed or a patch that has a changed Lab value, in which at least one of the L value and a b value of the Lab value of the adjustment color is changed, as a patch that is adjacent to the patch corresponding to the adjustment color among the patches corresponding to respective neighboring colors of the adjustment color, and by
 in a case where the L value of the Lab value of the adjustment color is less than the threshold, placing a patch that has a changed Lab value, in which at least one of the a value and the b value of the Lab value of the adjustment color is changed, as a patch that is adjacent to the patch corresponding to the adjustment color among the patches corresponding to respective neighboring colors of the adjustment color.

2. The image processing apparatus according to claim 1, wherein the first selection selects a color selected by a user, as the adjustment color.

3. The image processing apparatus according to claim 1, wherein the second selection selects a color corresponding to a patch selected by a user from the patches on the chart, as the target color.

4. The image processing apparatus according to claim 1, wherein, after the adjustment color selected by the first selection and the neighboring colors of the adjustment color are each converted into a color in a Lab color space, the patches corresponding to those colors are printed by the printer.

5. The image processing apparatus according to claim 1, wherein, in a case where the L value of the Lab value of the adjustment color has a value greater than the threshold and hue of the adjustment color has a value falling within a predetermined range, the determining assumes a plurality of patches arranged in an L-b plane of a Lab color space to be one patch group, and determines the arrangement of the patches so that a plurality of patch groups generated by changing an a value of the patch group stepwise are arranged on the chart.

6. The image processing apparatus according to claim 1, wherein, in a case where the L value of the Lab value of the adjustment color has a value greater than the threshold and hue of the adjustment color has a value falling outside a predetermined range, the determining assumes a plurality of patches arranged in an L-a plane of a Lab color space to be one patch group, and determines the arrangement of the patches so that a plurality of patch groups generated by changing a b value of the patch group stepwise are arranged on the chart.

7. The image processing apparatus according to claim 1, wherein, in a case where the L value of the Lab value of the adjustment color has a value smaller than the threshold, the determining assumes a plurality of patches arranged in an a-b plane of a Lab color space to be one patch group, and determines the arrangement of the patches so that a plurality of patch groups generated by changing an L value of the patch group stepwise are arranged on the chart.

8. The image processing apparatus according to claim 5, wherein the determining determines the arrangement of the patches to be included in the chart to be printed by the printer to be an arrangement in which the patch corresponding to the adjustment color is surrounded by the plurality of patch groups.

9. The image processing apparatus according to claim 6, wherein the determining determines the arrangement of the patches to be included in the chart to be printed by the printer to be an arrangement in which the patch corresponding to the adjustment color is surrounded by the plurality of patch groups.

10. The image processing apparatus according to claim 7, wherein the determining determines the arrangement of the patches to be included in the chart to be printed by the printer to be an arrangement in which the patch corresponding to the adjustment color is surrounded by the plurality of patch groups.

11. The image processing apparatus according to claim 5, wherein the value falling within the predetermined range is a hue of 0 degrees or more and less than 45 degrees, a hue of 135 degrees or more and less than 225 degrees, or a hue of 315 degrees or more and less than 360 degrees, and a value falling outside the predetermined range is a hue of 45 degrees or more and less than 135 degrees, or a hue of 225 degrees or more and less than 315 degrees.

12. The image processing apparatus according to claim 6, wherein a value falling within the predetermined range is a hue of 0 degrees or more and less than 45 degrees, a hue of 135 degrees or more and less than 225 degrees, or a hue of 315 degrees or more and less than 360 degrees, and the value falling outside the predetermined range is a hue of 45 degrees or more and less than 135 degrees, or a hue of 225 degrees or more and less than 315 degrees.

13. The image processing apparatus according to claim 1, wherein the printer is included in an image forming apparatus capable of communicating with the image processing apparatus.

14. The image processing apparatus according to claim 1, wherein the instructions further cause a display to display the patch corresponding to the adjustment color and the patches corresponding to the respective neighboring colors of the adjustment color, on a screen,
wherein the display displays the patches in an arrangement identical to the arrangement of the patches to be included in the chart to be printed by the print control, on the screen.

15. An image processing method, comprising:
performing first selection for selecting an adjustment color;
performing print control for causing a printer to print a chart including a patch corresponding to the adjustment color selected by the first selection and patches corresponding to respective neighboring colors of the adjustment color;
performing second selection for selecting a target color from the colors corresponding to the respective patches on the chart;
generating a color conversion table to be used for converting a color to be printed by the printer, by using the adjustment color selected in the first selection and the target color selected in the second selection; and
determining arrangement of the patches included in the chart printed by the printer based on a Lab value of the adjustment color selected in the first selection,
wherein, in the determining, the arrangement of the patches is determined by
in a case where an L value of the Lab value of the adjustment color is greater than a threshold, placing a patch that has a changed Lab value, in which at least one of the L value and an a value of the Lab value of the adjustment color is changed or a patch that has a changed Lab value, in which at least one of the L value and a b value of the Lab value of the adjustment color is changed, as a patch that is adjacent to the patch corresponding to the adjustment color among the patches corresponding to respective neighboring colors of the adjustment color, and by
in a case where the L value of the Lab value of the adjustment color is less than the threshold, placing a patch that has a changed Lab value, in which at least one of the a value and the b value of the Lab value of the adjustment color is changed, as a patch that is adjacent to the patch corresponding to the adjustment color among the patches corresponding to respective neighboring colors of the adjustment color.

16. The image processing method according to claim 15, wherein a color of a patch adjacent to a patch corresponding to the selected adjustment color is determined based on a color value of the patch corresponding to the selected adjustment color.

17. A computer-readable storage medium storing a program for causing a computer to execute an image processing method, the image processing method comprising:
performing first selection for selecting an adjustment color;
performing print control for causing a printer to print a chart including a patch corresponding to the adjustment color selected by the first selection and patches corresponding to respective neighboring colors of the adjustment color;
performing second selection for selecting a target color from the colors corresponding to the respective patches on the chart;
generating a color conversion table to be used for converting a color to be printed by the printer, by using the adjustment color selected in the first selection and the target color selected in the second selection; and
determining arrangement of the patches included in the chart printed by the printer based on a Lab value of the adjustment color selected in the first selection,
wherein, in the determining, the arrangement of the patches is determined by
in a case where an L value of the Lab value of the adjustment color is greater than a threshold, placing a patch that has a changed Lab value, in which at least one of the L value and an a value of the Lab value of the adjustment color is changed or a patch that has a changed Lab value, in which at least one of the L value and a b value of the Lab value of the adjustment color is changed, as a patch that is adjacent to the patch corresponding to the adjustment color among the patches corresponding to respective neighboring colors of the adjustment color, and by in a case where the L value of the Lab value of the adjustment color is less than the threshold, placing a patch that has a changed Lab value, in which at least one of the a value and the b value of the Lab value of the adjustment color is changed, as a patch that is adjacent to the patch corresponding to the adjustment color among the patches corresponding to respective neighboring colors of the adjustment color.

* * * * *